(12) United States Patent
Cheung

(10) Patent No.: US 6,595,119 B1
(45) Date of Patent: Jul. 22, 2003

(54) ROTISSERIE OVEN

(76) Inventor: Chun Kong Ian Cheung, Flat 1, 2/F, Kai Fuk Industrial Centre, 1 Wang Tung Street, Kowloon Bay, Kowloon, Hong Kong (HK)

( * ) Notice: Subject to any disclaimer, the term of this patent is extended or adjusted under 35 U.S.C. 154(b) by 0 days.

(21) Appl. No.: 10/171,259

(22) Filed: Jun. 13, 2002

(51) Int. Cl.⁷ .................... A47J 37/00; A47J 37/04; A47J 37/07
(52) U.S. Cl. .................. 99/420; 99/386; 99/419; 99/421 H; 99/427; 99/448; 99/443 C
(58) Field of Search .......... 99/330, 339, 340, 99/352–355, 386, 427, 403, 419–421 V, 443 R, 443 C, 444–450, 482; 126/25 R, 9 R, 41 R

(56) References Cited

U.S. PATENT DOCUMENTS

| | | | |
|---|---|---|---|
| 3,734,740 A | * | 5/1973 | Zenos ............... 99/427 X |
| 4,034,661 A | | 7/1977 | Boosalis et al. |
| 4,156,383 A | | 5/1979 | Maddox |
| 4,760,776 A | | 8/1988 | Beidler |
| 5,445,065 A | | 8/1995 | Lopata |
| 5,460,080 A | * | 10/1995 | Maru, Jr. ............ 99/420 |
| 5,490,451 A | | 2/1996 | Nersesian |
| 5,740,722 A | | 4/1998 | Emsens |
| 6,202,545 B1 | * | 3/2001 | McConnell ........ 99/421 H |
| 6,279,465 B1 | * | 8/2001 | English ............... 99/339 |
| 6,386,095 B1 | * | 5/2002 | Ausaf ................ 99/420 |

FOREIGN PATENT DOCUMENTS

| | | |
|---|---|---|
| CN | 2183145 Y | 11/1994 |
| CN | 2303462 Y | 1/1999 |
| CN | 2419833 Y | 2/2001 |
| CN | 2524504 Y | 12/2002 |
| FR | 2472367 | 3/1981 |

* cited by examiner

*Primary Examiner*—Timothy F. Simone
(74) *Attorney, Agent, or Firm*—Jackson Walker L.L.P.

(57) ABSTRACT

A Rotisserie Oven includes a heat source and a continuous conveyor mounted adjacent to the heat source. A number of skewer holding devices are affixed along the conveyor and each hold a skewer adjacent the heat source while being convey past the heat source. Turning devices are provided for rotating the skewers as they pass the heat source. A skewer detachment mechanism is provided to enable detachment of the skewer from the conveyor at an end of the rotisserie oven.

3 Claims, 5 Drawing Sheets

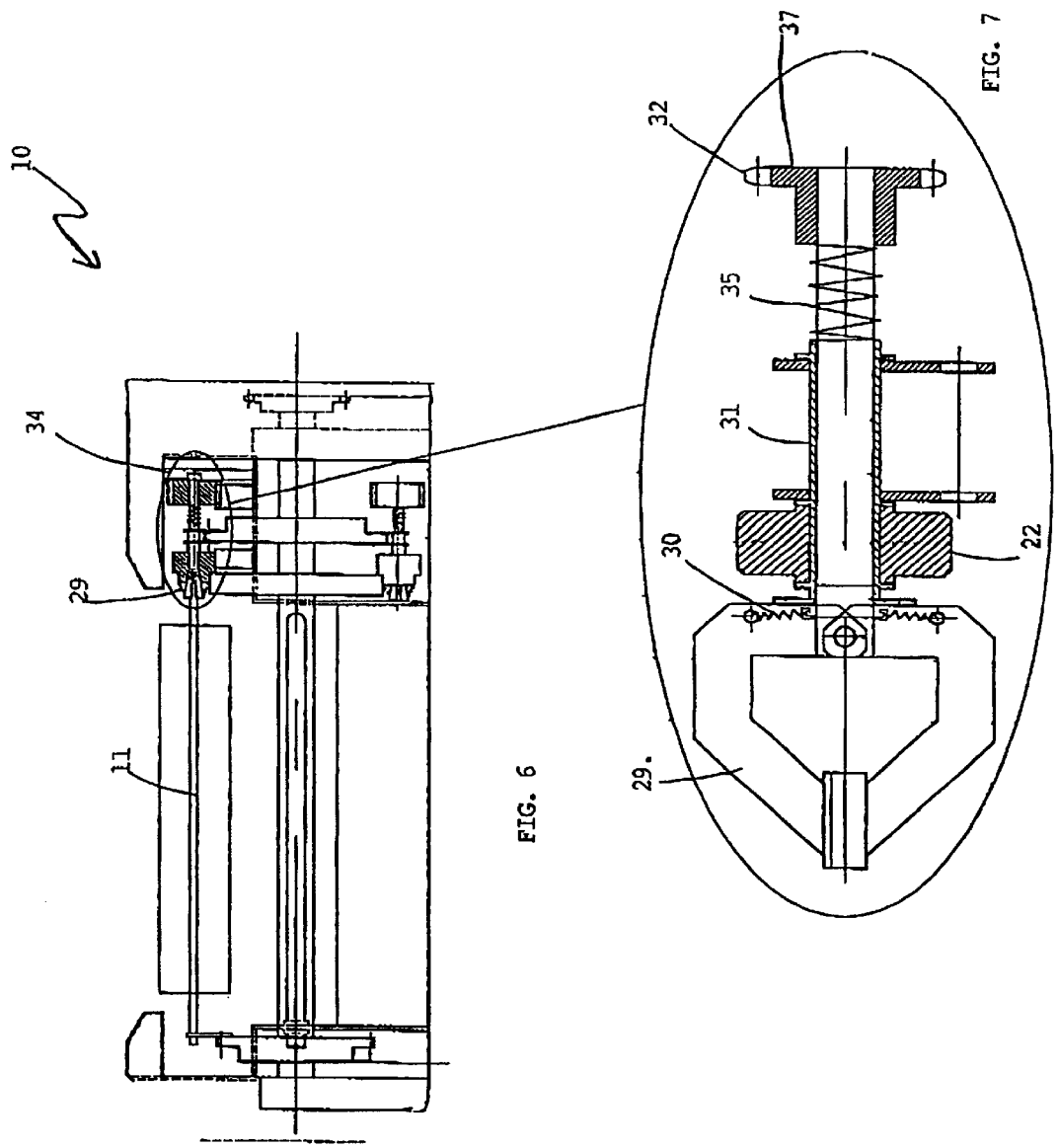

ROTISSERIE OVEN

FIELD OF THE INVENTION

The following invention relates to a rotisserie oven. More particularly, although not exclusively, the invention relates to an oven for rotationally cooking chicken pieces or other food items in a commercial food outlet.

It is known to cook food articles on a rotating skewer. Such skewers might be rotatably driven within an oven space or adjacent to a radiating heat source and rotate about a fixed axis. After a preset or estimated cooking time, the food article and/or skewer must be manually removed. If continued cooking occurs, the food article can dry out and lose its succulence. In fast food outlets, it is known to provide a chain conveyor-mounted array of horizontal skewers that circulate continuously past a radiational heat source. Typically, whole chickens or chicken pieces are mounted on the skewers and rotate continuously around an around past the heat source until they are removed individually in accordance with customer demand. In unexpected periods of low demand, the pieces continue to rotate past the heat source and dry out, therefore losing their succulence and become unappetizing.

Another problem associated with known rotisserie ovens and the like is that the skewers themselves must be recycled and cleaned after every use.

OBJECTS OF THE INVENTION

It is an object of the present invention to overcome or substantially ameliorate at least one of the above disadvantages.

It is another object of the present invention to provide a rotisserie oven for food articles, having improved throughput and providing cooked articles of good succulence and palatability.

It is another object of the present invention to provide a rotisserie oven in which the skewers are removed automatically from the oven when the food articles are cooked.

It is another object of the present invention to provide a rotisserie oven that produces cooked food articles on a skewer that is intended to accompany the food articles at sale.

DISCLOSURE OF THE INVENTION

There is disclose herein a rotisserie oven comprising:
a heat source,
a continuous conveyor mounted adjacent the heat source,
a plurality of skewer holding devices affixed along the conveyor, each for holding a skewer adjacent the heat source while being conveyed therepast by the conveyor,
a respective turning device attached to each skewer holding device for rotating each skewer as it is conveyed past the heat source, and
a skewer detachment device adjacent the conveyor and cooperative with each skewer holding device to detach any skewer attached thereto as the skewer holding devices pass the skewer detachment device in use.

Preferably the conveyor comprises a pair of parallel chains, each forming an endless loop.

Preferably the respective turning devices are pinion gears and the oven further comprises a fixed rack along which the pinion gears mesh to effect rotation thereof.

Preferably the skewer holding devices each comprise a peg having two arms, a first arm being fixed to a link of one of said chains and the second arm being pivotable with respect to the first arm.

Preferably, the oven further comprises a skewer attachment device having a fixed bearing surface against which the skewer holding device bears to allow attachment of a skewer thereto effect pivotting a skewer therefrom.

Alternatively the skewer holding devices each comprise a clamp activatable by a respective pusher that moves in a direction transverse to the extent of each chain, the pusher cooperating with a bearing surface at one end of the conveyor to detach a skewer.

BRIEF DESCRIPTION OF THE DRAWINGS

Preferred forms of the present invention will now be described by way of example with reference to the accompanying drawings wherein:

FIG. 6 is a schematic end elevational view of a conveyor portion of an oven having a difference type of skewer holder;

FIG. 7 is a schematic elevational view of the different skewer holder of FIG. 6.

DESCRIPTION OF THE PREFERRED EMBODIMENTS

Figure 1:
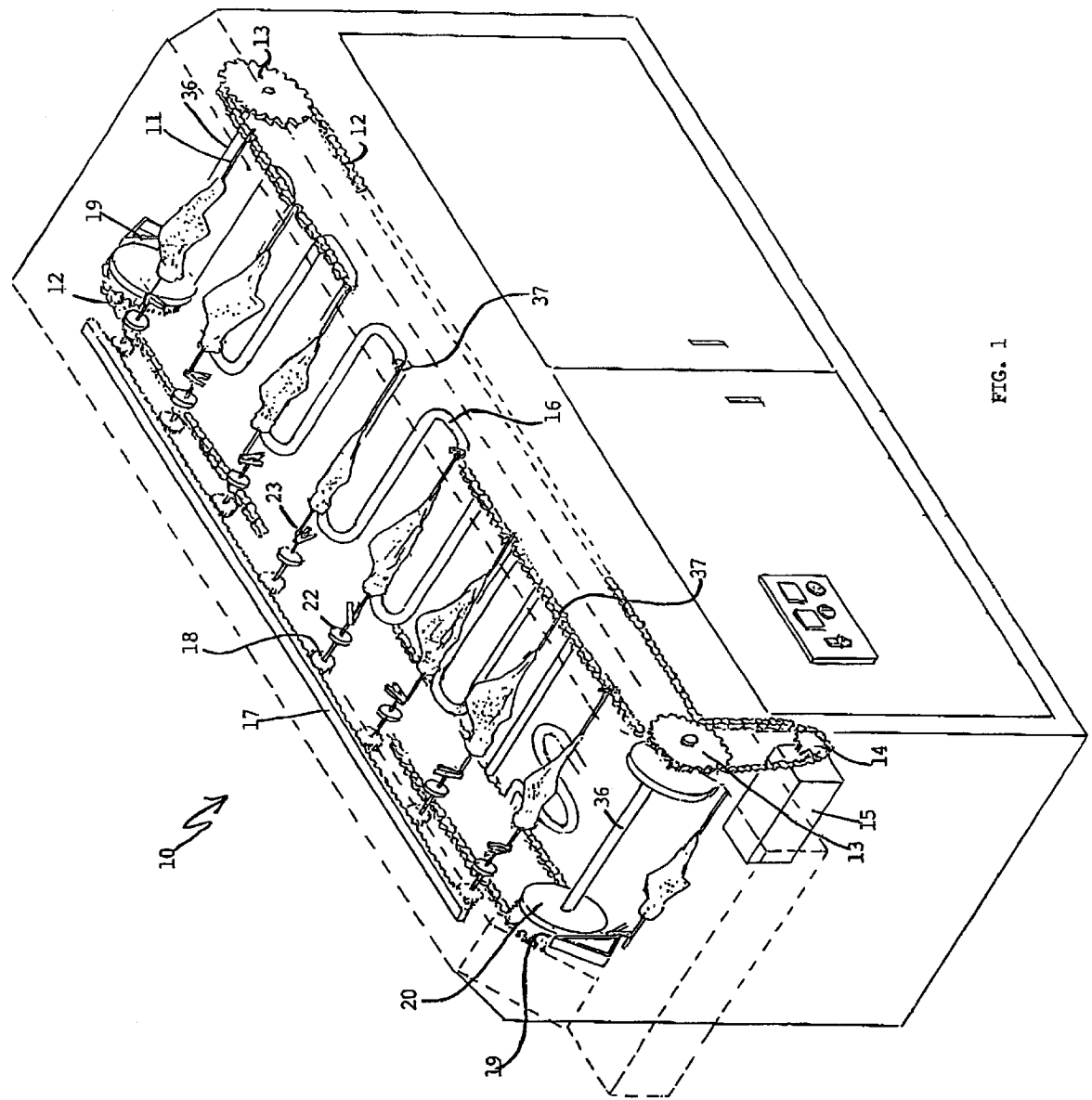
FIG. 1 is a schematic perspective view of a rotisserie oven.

In the accompanying drawings there is schematically depicted a rotisserie oven 10. Rotisserie oven 10 works by conveying food items such as chicken wings on bamboo skewers 11 past a heat source such as heating element 16.

Each skewer 11 is temporarily affixed between a pair of endless conveyor chains 12. As heat energy radiates upwardly from the heat source, the food item or items upon each skewer 11 is/or cooked and any fat exuding therefrom can drip through/past the heating elements into a tray situated therebeneath.

Heating element 16 might be electrically powered. As an alternative, a gas flame or gas fired radiating grate might be provided.

Each of the conveyor chains 12 pass around respective end sprockets 13. That is, at each end of the oven, there is a pair of sprockets 13 connected to rotate in unison by a transverse shaft 36.

Attached at evenly spaced locations along one or both of the chains 12 are skewer holders 23. These are mounted upon rotational shafts, each shaft extending from a pinion gear 18. Each pinion gear 18 cooperates with a longitudinal rack 17. That is, as the chain 12 moves, the skewer holders and pinions pass the rack. The pinions rotate due to their meshing interengagement with the rack 17.

The distal ends of the skewers are held in a V-shaped holder 37, many of which are attached to the opposite chain 12 at locations opposite each skewer holder 23. Gravity holds these ends of the skewers in the V-shaped holders 37.

Figure 2:
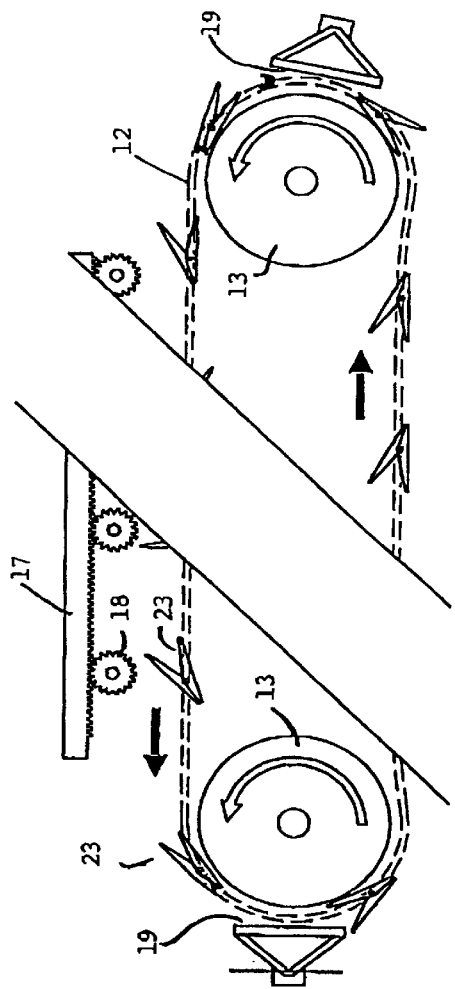
FIG. 2 is a schematic side elevational view of a conveyor portion of the oven of FIG. 1 in use.
Figure 3:
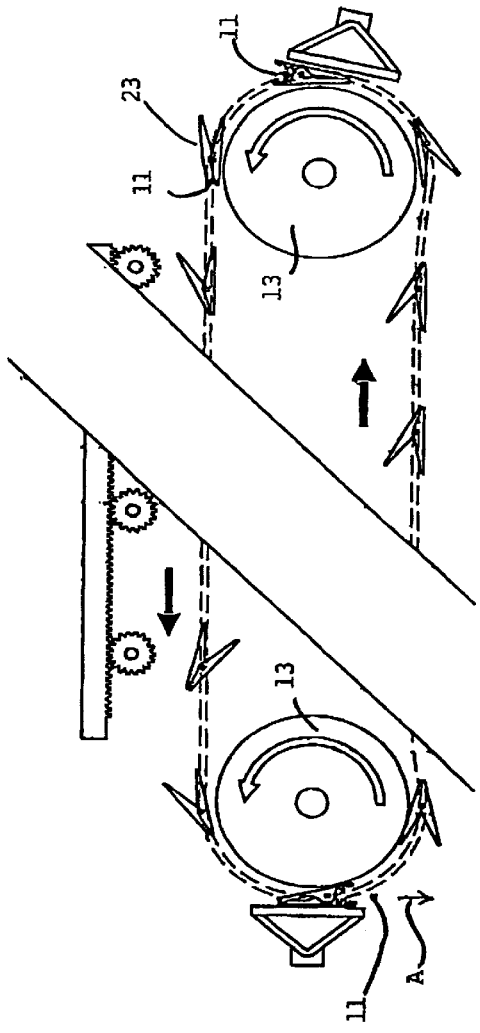
FIG. 3 is another schematic side elevational view of a conveyor portion of the oven of FIG. 1 in use.
Figure 4:
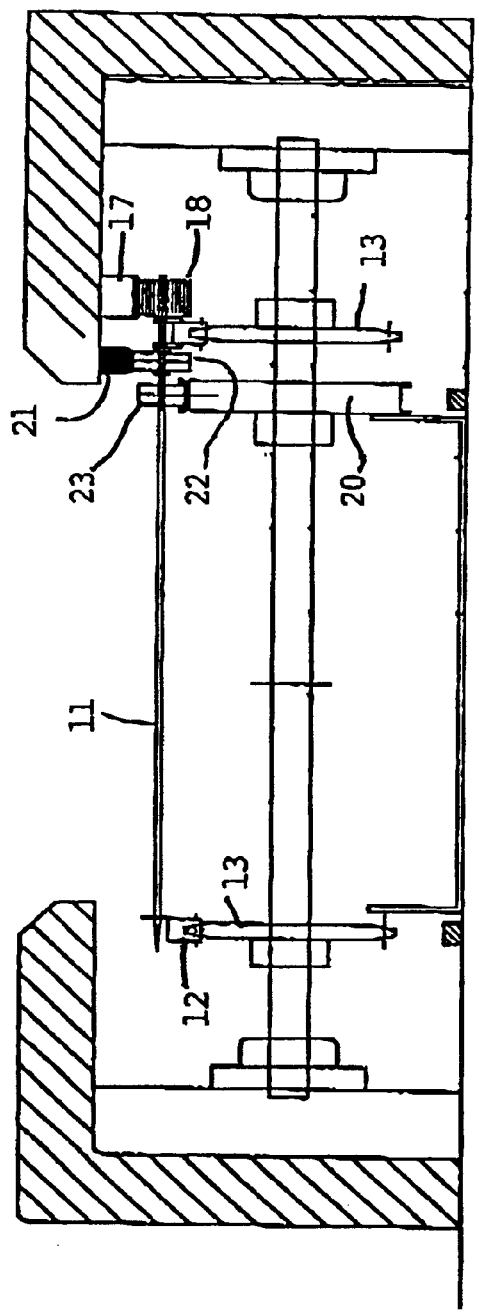
FIG. 4 is a schematic end elevational view of the conveyor portion of the oven of FIGS. 2 and 3.
Figure 5:
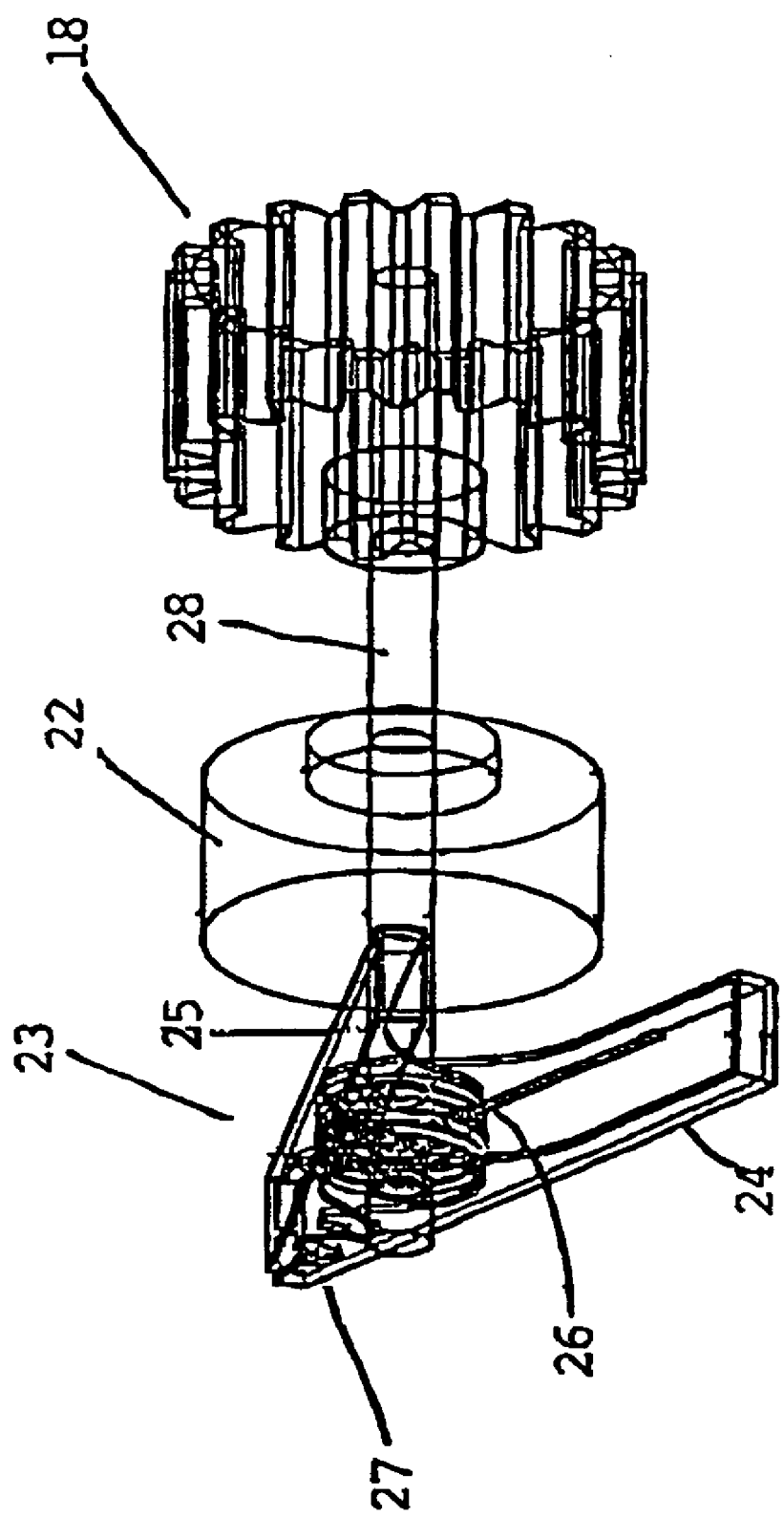
FIG. 5 is a schematic perspective view of a first type of skewer holder.

In FIGS. 2 and 3, the rack 17 and pinions 18 are schematically shown separated from the chain 12. However, in reality, the skewer holders 23 and pinion 18 are upon a common horizontal shaft 28. The skewer holders 23 move in the direction indicated by the arrows in FIG. 2. In the depicted embodiment, and as better illustrated in FIG. 5, each skewer holder is formed somewhat like a clothes peg including first and second arms 24 and 25 biassed into a closed, clasping position by an internal coil spring 26. A skewer recess 27 is provided between the closed or grasping ends of the respective arms and it is from this recess that a skewer extends. As seen in FIG. 5, the skewer holder 23 and pinion 18 are mounted upon the common shaft 28 in fixed relationship so as to both rotate in unison. Also mounted upon the shaft 28 is a roller 22 which, as shown in FIG. 4, rides against a track 21 so as to maintain the horizontal nature of the shaft 28 in use.

Referring again to FIG. 2, there is provided at each end of the conveyor, a respective bearing surface 19 against which the second arms 25 of the skewer holders 25 interact. At the right hand end of FIG. 2 (the pick-up end), the skewer holders 23 open as a result of interaction of the second arm 25 with the bearing surface 19 to cause the skewer holder to open and enable the recess 27 to close about an end portion of a skewer 11. As conveyed slowly from right to left in FIG. 2, any food item mounted on a skewer will be cooked. That is, the conveyor is driven slowly such that the cooking time coincides with the time that it takes to convey the skewer between the respective sprockets in one pass only.

At the left hand end (the delivery end) of the oven shown in FIG. 2, the other bearing surface 19 interacts with the second arm 25 to disengage a skewer 11 so that it falls out in a direction indicated by arrow A in FIG. 3. A food receiving receptacle or tray (not shown) can be provided underneath arrow A.

As can be seen, the skewer holders 23 rotate due to the interaction of pinions 18 with rack 17. This rotation ensures even cooking of the food articles that are mounted on the skewers. In this embodiment, it is important that the chain 12 be carefully mounted to the is sprockets 13 to ensure that the skewer holders approach and interact with the bearing surfaces 19 for proper operation. If the chain is incorrectly mounted upon the sprocket, the skewer holders might approach the bearing surfaces 19 in a skew or reverse orientation in which case jambing or might occur. This is addressed in the embodiment of FIGS. 6 and 7 in which a different type of skewer holder or clamp 29 is provided. In this embodiment, a clamp 29 is activated in a direction parallel to the extent of each skewer 11. The clamp 29 is activated by a push rod 31 also moving in a direction parallel to the extent of the skewer. The push rod is activated by an activator 32 having a follower surface 33. Surface 33 bears against a fixed cam surface 34 as it moves therepast. A buffer spring 35 is situated between the activator 32 and the push rod 31 to absorb any shock forces.

The clamp 29 includes springs 30 to maintain the clamp in a closed position against the end portion of skewer 11.

Again, a cam surface is provided at both ends of the conveyor to activate clamp 29 in a similar manner as bearing surfaces 19 are provided in the fist embodiment.

The skewers 11 are preferably single-use bamboo skewers to be sold with the food pieces to customers. The food pieces might typically be chicken wings which can be eaten by the customer directly off the skewer whereupon the skewer can be discarded, recycled or otherwise used.

It should be appreciated that modifications and alternations obvious to those skilled in the art are not to be considered as beyond the scope of the present invention. For example, rather than providing a horizontally orientated heating source, the heat radiator might be vertical or inclined and the conveyor might convey the food pieces in a vertical or inclined plane, rather than the horizontal plane of the described embodiments. Also, rather than providing a rack and pinion arrangement, the skewers might be turned by a chain and sprocket arrangement, that is, the rack could be replaced by a chain and the pinions could be replaced by sprockets.

What is claimed is:

1. A rotisserie oven comprising:

a heat source;

a continuous conveyor mounted adjacent the heat source, said conveyor having a pair of parallel chains, each forming an endless loop;

a plurality of skewer holding devices affixed along the conveyor, each for holding a skewer adjacent the heat source while being conveyed therepast by the conveyor, each skewer holding device having a peg having two arms, a first arm being fixed to a link of one of said chains and a second arm being pivotable with respect to the first arm;

a respective turning device attached to each skewer holding device for rotating each skewer as it is conveyed past the heat source; and a skewer detachment device adjacent the conveyor and cooperative with each skewer holding device to detach any skewer attached thereto as the skewer holding devices pass the skewer detachment device.

2. The oven of claim 1 wherein the skewer holding devices each comprise a clamp activatable by a respective pusher that moves in a direction transverse to the extent of each chain, the pusher cooperating with a bearing surface at one end of the conveyor to detach a skewer.

3. The oven of claim 1 wherein the respective turning devices are sprockets and the oven further comprises: an affixed chain along which the sprockets mesh to effect rotation thereof and a skewer attachment device having a fixed bearing surface at one end of the conveyor against which the skewer holding device bears to allow attachment of a skewer thereto.

\* \* \* \* \*